United States Patent
Lipson

(10) Patent No.: US 10,946,403 B2
(45) Date of Patent: Mar. 16, 2021

(54) TACKY NETTING FOR COLLECTING DIRT AND PAINT OVERSPRAY

(71) Applicant: Ronald Lipson, Orchard Lake, MI (US)

(72) Inventor: Ronald Lipson, Orchard Lake, MI (US)

(*) Notice: Subject to any disclaimer, the term of this patent is extended or adjusted under 35 U.S.C. 154(b) by 0 days.

(21) Appl. No.: 16/190,614

(22) Filed: Nov. 14, 2018

(65) Prior Publication Data

US 2020/0147630 A1    May 14, 2020

(51) Int. Cl.

| | |
|---|---|
| *B05B 14/48* | (2018.01) |
| *B01D 46/00* | (2006.01) |
| *D04B 21/12* | (2006.01) |
| *B05B 12/32* | (2018.01) |
| *D03D 9/00* | (2006.01) |

(52) U.S. Cl.
CPC .......... *B05B 14/48* (2018.02); *B01D 46/0035* (2013.01); *B05B 12/32* (2018.02); *D03D 9/00* (2013.01); *D04B 21/12* (2013.01); *D10B 2331/021* (2013.01)

(58) Field of Classification Search
CPC ..... B01D 46/0035; B05B 14/48; B05B 12/32; B05B 14/43
See application file for complete search history.

(56) References Cited

U.S. PATENT DOCUMENTS

| | | | | |
|---|---|---|---|---|
| 4,004,899 A | * | 1/1977 | Giacovas | B01D 46/10 55/499 |
| 2007/0277487 A1 | * | 12/2007 | Thurin | B01D 46/0028 55/471 |
| 2014/0041525 A1 | * | 2/2014 | Morrow | A47L 7/04 96/222 |

* cited by examiner

*Primary Examiner* — Robert Clemente
(74) *Attorney, Agent, or Firm* — Law Offices of John G. Posa

(57) ABSTRACT

A flexible sheet collects overspray and keeps spray booth environments clean, thereby reducing or eliminating dust and foreign matter from landing on wet painted surfaces which might otherwise result in a paint surface defect. The flexible sheet comprises a woven or non-woven mesh or net material having apertures or perforations that penetrate through the sheet. The sheet is impregnated with a tacky substance, such that paint overspray and dirt particles cling to the impregnated sheet. In the preferred embodiment, the tacky substance is a wax-based substance, more preferably a natural or synthetic beeswax-based substance. The material may be made from polymeric filaments of nylon or other natural or synthetic fibers, threads or strands. The flexible sheet of material may be provided in roll form for use. Method of making a tacky netting are also disclosed. The product is particularly useful in vehicle spray-booth applications.

17 Claims, 2 Drawing Sheets

TACKY NETTING FOR COLLECTING DIRT AND PAINT OVERSPRAY

FIELD OF THE INVENTION

This invention relates generally to spray paint barriers and, in particular, to a netting material with a tacky coating to enhance the collection efficiency of overspray and dirt particles.

BACKGROUND OF THE INVENTION

In the automotive industry, the average paint shop may paint upwards of 1000 vehicles a day. Even the smallest amount of contamination will cause major problems. Any defect that is visually seen by trained inspectors has to be removed by sanding and polishing.

To collect overspray, many shops use a brush-on or spray-on booth coating. The coating adheres to the interior walls of the spray booth, but is not sticky enough to attract dirt. As such, existing coatings only protect overspray from getting on the walls of the spray booth. While such coatings are said to be peeling coatings, in many cases the booth coating has to be pressure washed off the booth walls, resulting in hours of production down time.

There are various barriers, filters and baffles to collect overspray. U.S. Pat. No. 4,530,274, for example, discloses a spray booth with a front movable wall composed of two layers of flexible filter material supplied from a single continuous supply roll located adjacent the floor of the booth. The layers of filter material are composed of a mat of closely-spaced non-woven extruded polypropylene fibers forming a multiplicity of cells and randomly positioned non-woven polypropylene fibers extending from the mat into each said cell to provide sub-cells of sub-micron size openings.

While existing overspray collection sheets may be effective in some case, none are coated with an attractant to enhance collection efficiency

SUMMARY OF THE INVENTION

This invention resides in a sheet product that collects overspray and keeps spray booth environments clean. The system further reduces or eliminates dust and foreign matter from landing on the wet painted surface which would otherwise result in a paint surface defect.

The product, a flexible sheet of material adapted to hang proximate to a spray painting operation, comprises a woven or non-woven mesh or net material having apertures or perforations that penetrate through the sheet. The sheet is impregnated with a tacky substance, such that paint overspray and dirt particles cling to the impregnated sheet.

In the preferred embodiment, the tacky substance is a wax-based substance, more preferably a natural or synthetic beeswax-based substance. The formulation may further include a surfactant or wetting agent, a resin or oil and, as a further option, a flame retardant. One or both of the upper and lower edges of the material may include spaced-apart eyelets for hanging purposes.

The flexible sheet of material may be a knitted or chain-stitched material made from polymeric filaments of nylon or other natural or synthetic fibers, threads or strands. The flexible sheet of material may be provided in roll form for use.

A method of making a tacky netting according to the invention comprises the steps of providing a flexible sheet of woven or non-woven mesh or net material having apertures or perforations that penetrate through the sheet; coating or impregnating the sheet of material with a tacky substance; and hanging the impregnated sheet in a spray booth or other area associated with spray painting.

To coat or impregnate the material, the method may include the steps of passing the sheet of material through a bath of molten wax and removing excess wax with a squeegee or blade prior to drying and packaging.

DETAILED DESCRIPTION OF THE PREFERRED EMBODIMENTS

In broad and general terms, the products described herein may be thought of as "tacky netting." In the preferred embodiment, the netting comprises is a monofilament nylon (similar to fishing line) mesh impregnated with an "open tack" formulation that allows the netting to stay sticky for prolonged periods of time, up to 6 months under normal conditions.

Figure 1:
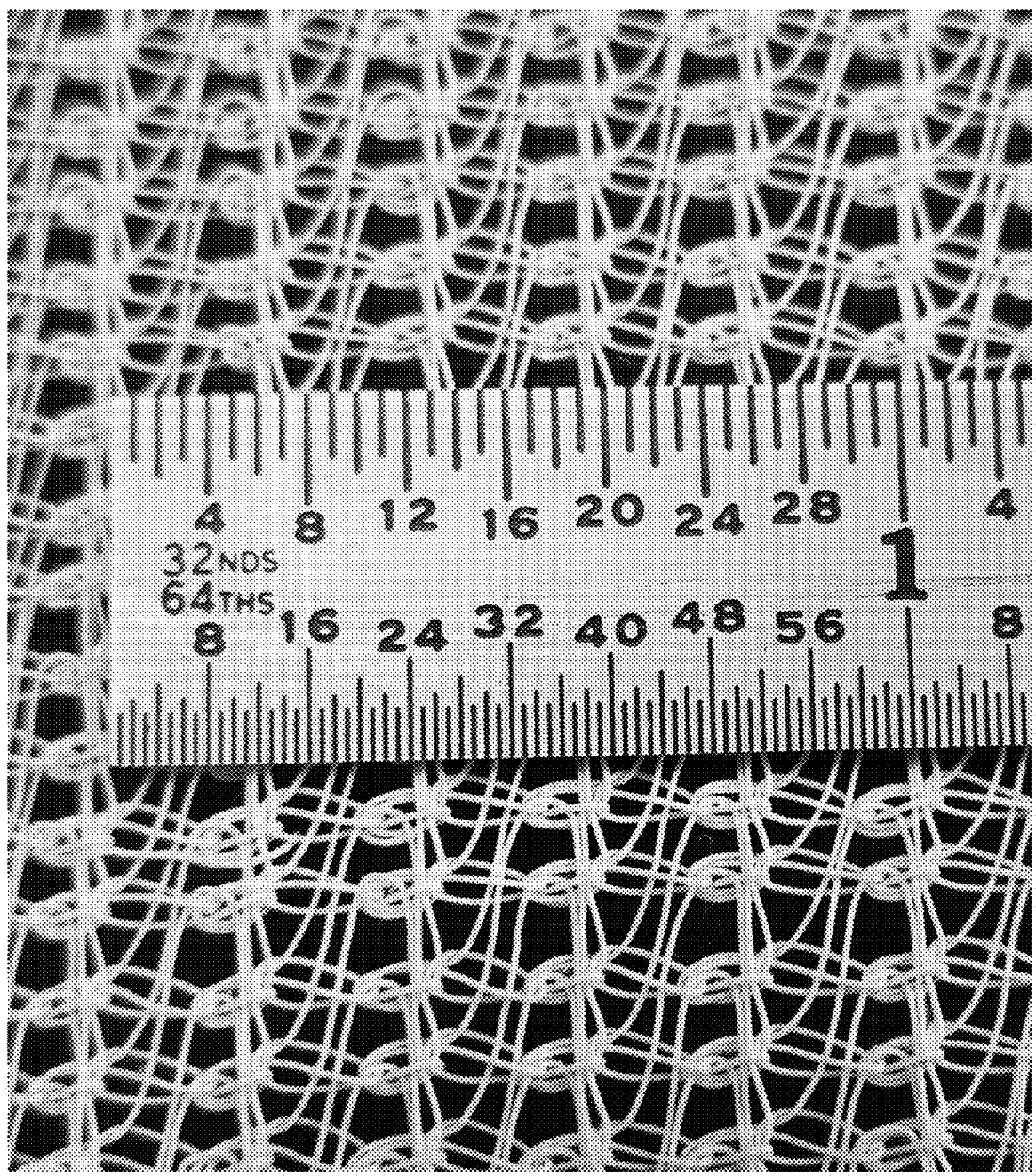
FIG. 1 is a photograph showing one type of tacky netting material according to the invention.

FIG. 1 shows one type of netting material applicable to the invention, with the understanding that other materials are possible. For example, while woven material is preferred, non-woven (i.e., spun-bonded or perforated) materials may alternatively be used. Further, while a nylon composition is preferred, other polymeric materials may alternatively be used, including polyethylene, polypropylene, polystyrene, PVC, ABS, and so forth.

It was discovered, through trial-and-error and experimentation, that the "close-knit" design shown in FIG. 1 works best to trap dirt particles and paint overspray. It was found that a mesh weight in the range of 35-75 GPM is applicable, though more preferably in the range of 45-65 GPM, and most preferably 55 GPM. It was further determined that a mesh density in the range of 0.75-1.0 works well, more preferably 0.9. For ease of installing, the netting material is provided in rolls. One preferred roll measures 72"×160'. This roll weighs approximately 30 lbs, which is relatively easy for the average person to handle, lift and install.

Figure 2:
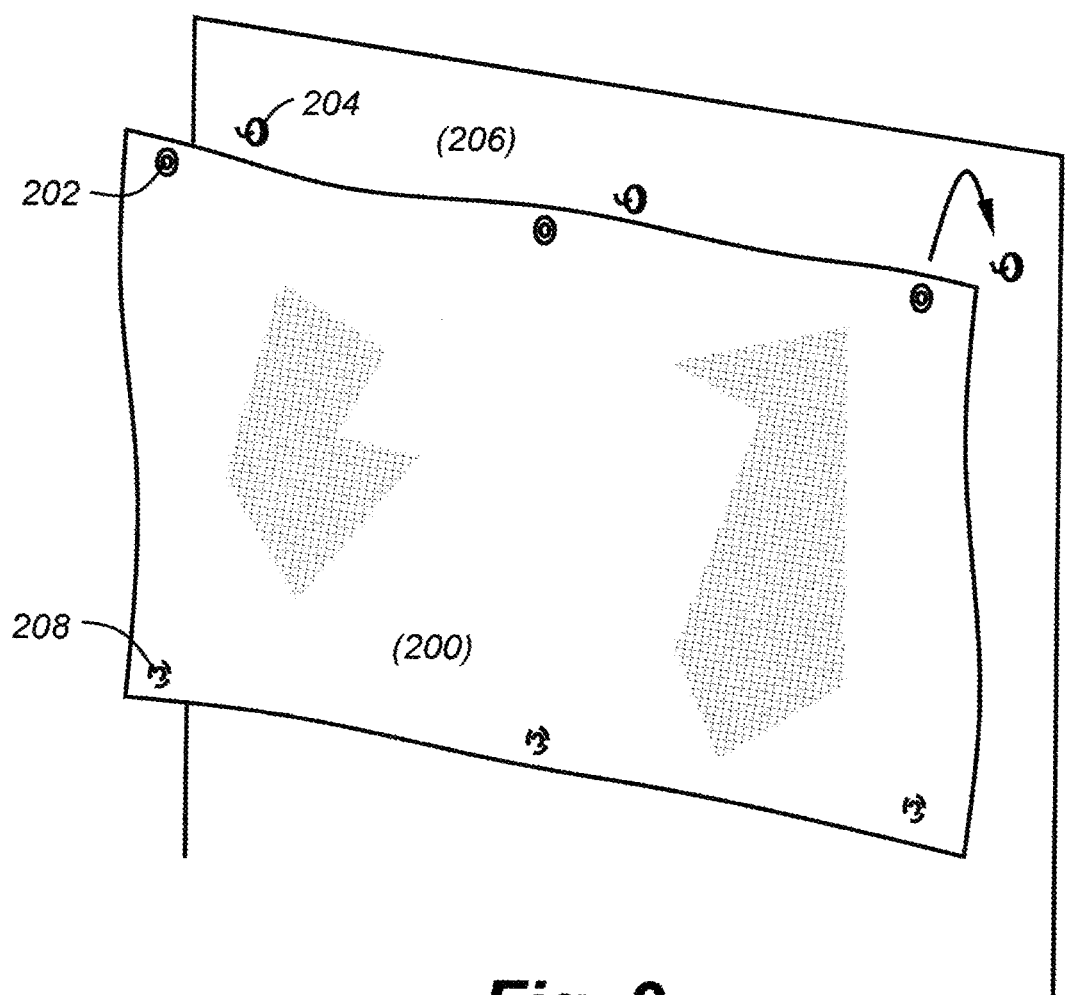
FIG. 2 illustrates a material hanging system.

In use, the material hangs up similar to a shower curtain and is therefore installs easily and quickly. As shown in FIG. 2, to install the netting 200 without having to touch the ground and risk contamination, spaced-apart eyelets 202, 208 may be provided along one or both edges of the material. In a preferred embodiment, ½" eyelets are provided every 2' at the top and bottom of the roll of netting. It was determined through further testing that hook magnets 204 worked best to support the netting. In particular, it was found that neodymium magnets with a 40 lb. holding strength support the netting on a backing 206 or horizontal bar even the material becomes loaded with dirt and overspray.

The chemistry of the tacky portion should take into consideration heat (from spray booths, which may be up to 175 F), be non-contaminating, and stay tacky for prolonged periods of time. To accomplish these goals, the tacky substance is wax-based. The netting material is drawn through a bath of liquefied wax, and squeegee blades are used to remove excess liquid prior to rolling and packaging.

The preferred embodiment uses a beeswax-based formula that is liquefied by heating to over 190 F. The beeswax may be natural or synthetic, and other alternatives are possible including candelilla and other formulations known in the art. In addition to the beeswax, the preferred embodiment includes a surfactant (wetting agent) that helps keep the formula in suspension. A combination of resins or oils such as linseed oil may be present as well. A flame retardant may be added, allowing the netting to be placed in areas where there is electricity, since, in many cases, paint is sprayed electrostatically.

In terms of packaging, an easy-to-use dispenser includes a perforated slit the length of the box. This allows the user to pull the netting out of the box without having to touch another surface and become contaminated. The inside of the box is also preferably plastic coated so that no fibers from the box can attach to the netting roll.

The invention claimed is:

1. A product for collecting overspray and contaminants, comprising:
    a flexible sheet of material adapted to hang as a flat curtain proximate to a spray painting operation;
    wherein the sheet of material is a knitted or chain-stitched mesh or net material made from polymeric filaments having apertures or perforations that penetrate through the sheet; and
    wherein the sheet is impregnated with a tacky substance, such that paint overspray and dirt particles cling to the impregnated sheet.

2. The product of claim 1, wherein the tacky substance is a wax-based substance.

3. The product of claim 1, wherein the tacky substance is a beeswax-based substance.

4. The product of claim 1, wherein the tacky substance includes wax and a surfactant or wetting agent.

5. The product of claim 1, wherein the tacky substance includes wax, a surfactant, and a resin or oil.

6. The product of claim 1, wherein the tacky substance includes a flame retardant.

7. The product of claim 1, wherein:
    the material has upper and lower edges; and
    one or both of the upper and lower edges includes spaced-apart eyelets for hanging purposes.

8. The product of claim 1, wherein the polymeric filaments are nylon.

9. The product of claim 1, wherein the flexible sheet of material is provided in roll form for use.

10. A method of making a tacky netting used to collect overspray and dirt in a spray booth, comprising the steps of:
    providing a flexible sheet of woven or non-woven mesh or net material having apertures or perforations that penetrate through the sheet;
    coating or impregnating the sheet of material with a tacky substance; and
    hanging the impregnated sheet in a spray booth or other area associated with spray painting.

11. The method of claim 10, including the step of passing the sheet of material through a bath of molten wax.

12. The method of claim 10, including the step of removing excess wax with a squeegee or blade.

13. The method of claim 10, wherein:
    the sheet includes spaced-apart eyelets along at least one edge; and
    hanging the sheet from the eyelets.

14. The method of claim 10, including the step of providing the sheet in roll form for use.

15. A product for collecting overspray and contaminants, comprising:
    a flexible sheet of material having upper and lower edges;
    wherein one or both of the upper and lower edges of the flexible sheet include spaced-apart eyelets for hanging as a flat curtain proximate to a spray painting operation;
    wherein the flexible sheet of material is a woven or non-woven mesh or net material having apertures or perforations that penetrate through the sheet; and
    wherein the sheet is impregnated with a tacky substance, such that paint overspray and dirt particles cling to the impregnated sheet.

16. The product of claim 15, wherein the tacky substance is a wax-based substance.

17. The product of claim 15, wherein the tacky substance includes a flame retardant.

* * * * *